US 10,008,234 B2

(12) United States Patent
Ishizuka et al.

(10) Patent No.: US 10,008,234 B2
(45) Date of Patent: Jun. 26, 2018

(54) DISC TRANSFER DEVICE

(71) Applicant: Panasonic Intellectual Property Management Co., Ltd., Osaka (JP)

(72) Inventors: Masakazu Ishizuka, Hyogo (JP); Kenji Shiomi, Osaka (JP); Yukio Morioka, Osaka (JP); Yuji Ariyoshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/705,903

(22) Filed: Sep. 15, 2017

(65) Prior Publication Data

US 2018/0005660 A1 Jan. 4, 2018

Related U.S. Application Data

(63) Continuation of application No. PCT/JP2015/006287, filed on Dec. 17, 2015.

(30) Foreign Application Priority Data

Mar. 24, 2015 (JP) ................................. 2015-061375

(51) Int. Cl.
*G11B 17/04* (2006.01)
*G11B 17/051* (2006.01)
(Continued)

(52) U.S. Cl.
CPC ............ *G11B 17/051* (2013.01); *G11B 17/26* (2013.01); *G11B 17/30* (2013.01)

(58) Field of Classification Search
None
See application file for complete search history.

(56) References Cited

U.S. PATENT DOCUMENTS 4,682,320 A 7/1987 d'Alayer de Costemore d'Arc
5,255,255 A 10/1993 Kaneda et al.
(Continued)

FOREIGN PATENT DOCUMENTS

JP 61-210556 9/1986
JP 4-195854 7/1992
(Continued)

OTHER PUBLICATIONS

English-machine translation of JP 2013-222490A to Ariyoshi et al., published on Oct. 28, 2013.*
(Continued)

*Primary Examiner* — William J Klimowicz
(74) *Attorney, Agent, or Firm* — Wenderoth, Lind & Ponack, L.L.P.

(57) ABSTRACT

A disc transfer device according to the present disclosure is a disc transfer device that transfers a disc in a first direction from a first position toward a third position via a second position, and includes a roller, a roller support mechanism, a first retaining member, a second retaining member, and a retaining member support mechanism. The roller rotates in a state of contact with a disc end face on one side in a second direction being orthogonal to the first direction, until the disc reaches the third position from the first position. The roller support mechanism supports the roller such that the roller is in contact with the transferred disc and is moveable in the first direction and the second direction. The first retaining member extends in the first direction, and is brought into contact with the disc end face on the other side in the second direction until the disc reaches at least the second position from the first position. The second retaining member is brought into contact with the disc end face on the other side in the second direction until the disc reaches the third position from the second position. The retaining member (Continued)

support mechanism supports the second retaining member such that the second retaining member is in contact with the transferred disc and is moveable in the first direction and the second direction.

6 Claims, 18 Drawing Sheets

(51) Int. Cl.
   *G11B 17/26* (2006.01)
   *G11B 17/30* (2006.01)

(56) References Cited

U.S. PATENT DOCUMENTS

| | | | |
|---|---|---|---|
| 5,852,597 A * | 12/1998 | Fujisawa | G11B 17/223 369/30.32 |
| 6,178,153 B1 * | 1/2001 | Cho | G11B 17/225 369/30.55 |
| 7,266,828 B2 | 9/2007 | Inoue | |
| 7,302,694 B2 | 11/2007 | Kikkoji | |
| 8,171,505 B2 | 5/2012 | Katsuki | |
| 8,266,641 B2 * | 9/2012 | Chien | G11B 17/051 720/621 |
| 2003/0161226 A1 * | 8/2003 | Ito | G11B 17/223 369/30.88 |
| 2005/0160439 A1 * | 7/2005 | Inoue | G11B 17/051 720/621 |
| 2011/0173645 A1 * | 7/2011 | Chang | G11B 17/051 720/628 |
| 2015/0194180 A1 | 7/2015 | Morioka et al. | |

FOREIGN PATENT DOCUMENTS

| | | |
|---|---|---|
| JP | 2008-103009 | 5/2008 |
| JP | 2013-222490 | 10/2013 |
| WO | 2006/132304 | 12/2006 |
| WO | 2014/185059 | 11/2014 |

OTHER PUBLICATIONS

International Search Report dated Mar. 8, 2016 in corresponding International Application No. PCT/JP2015/006287.
Extended European Search Report dated Dec. 15, 2017 for European Patent Application No. 15886209.4.

* cited by examiner

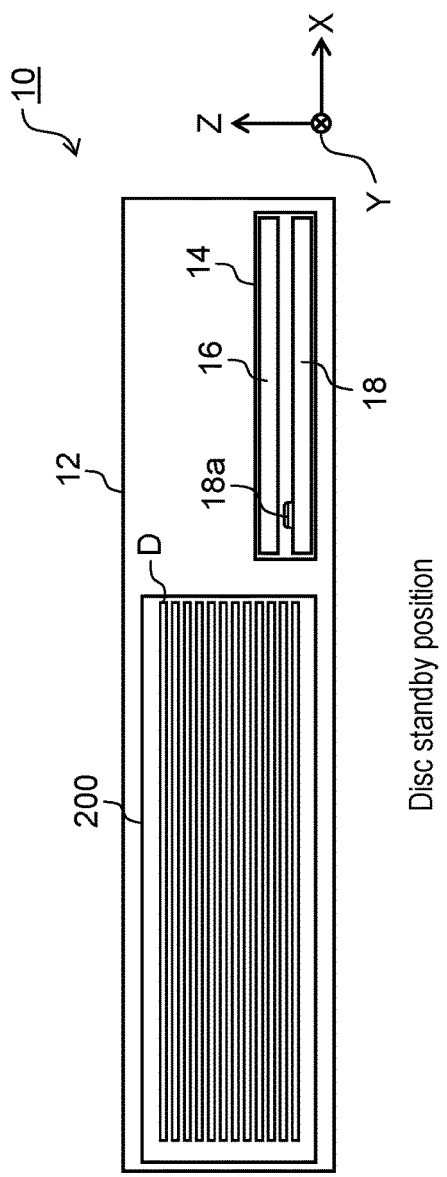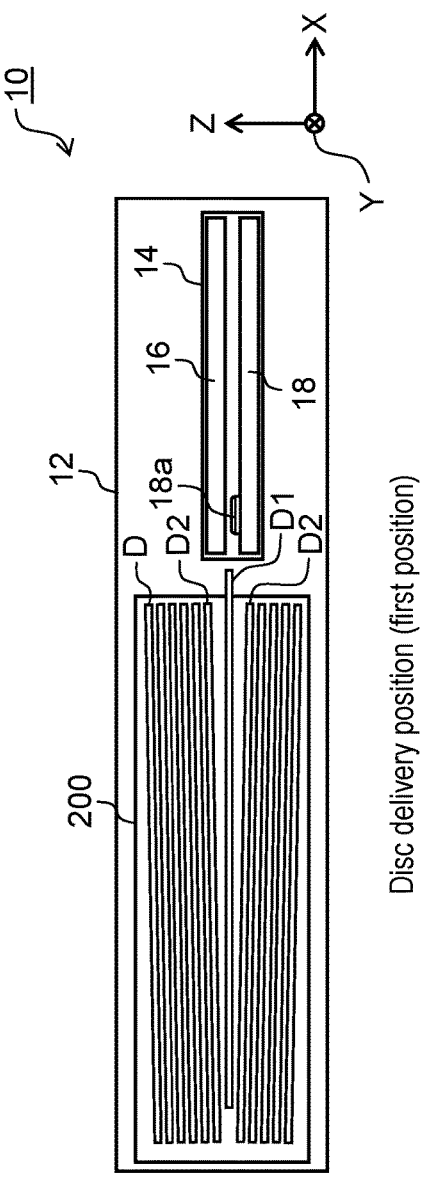

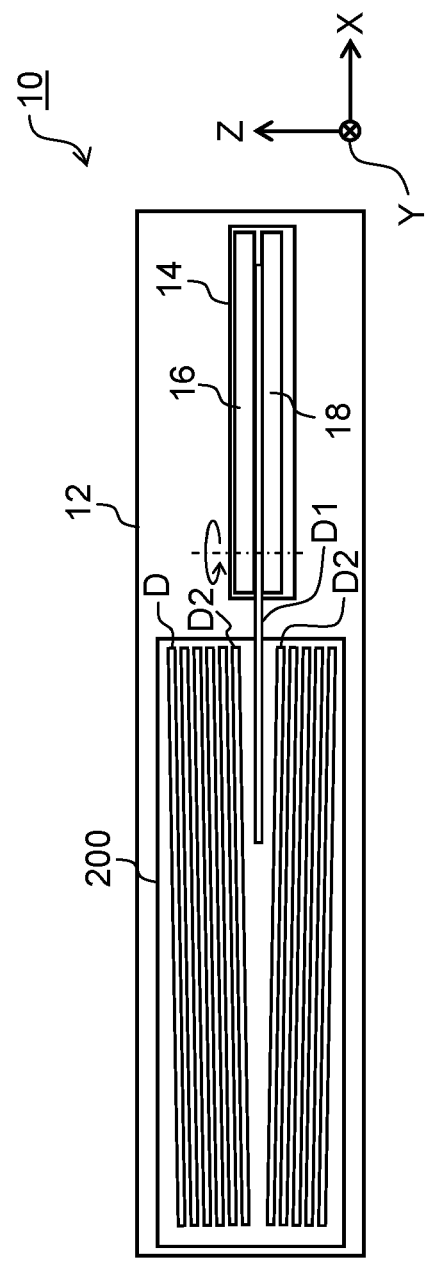

Disc delivery position (first position)

Second position

Disc record/reproduction position (third position)

DISC TRANSFER DEVICE

BACKGROUND

1. Technical Field

The present disclosure relates to a disc transfer device which transfers a disc in a radial direction of the disc.

2. Description of Related Art

A disc transfer device described in WO 2014/185059 includes first and second rollers (retaining members) each of which is brought into contact with a radial end face of a disc to hold the disc. The disc transfer device further includes first and second arms each of which has a free end revolvable around a revolution center axis extending in a thickness direction of the disc. The first and second rollers are supported via the free ends of the first and second arms, respectively.

When the first roller rotating around a rotation center axis extending in the thickness direction of the disc rolls on the end face of the disc, a distance between the first and second rollers increases in accordance with revolutions of the first and second arms. The disc therefore shifts to enter between the first and second rollers. The disc continues shifting until a center of the disc finally enters between the first and second rollers. Transfer of the disc is achieved as a result of this shift.

SUMMARY

A disc transfer device in an aspect of the present disclosure is a disc transfer device that transfers a disc in a first direction, being a radial direction of the disc, from a first position toward a third position via a second position. The disc transfer device includes a roller, a roller support mechanism, a first retaining member, a second retaining member, and a retaining member support mechanism. The roller rotates around a rotation center axis that extends in a third direction, being a thickness direction of the disc, in a state that the roller is brought into contact with a radial end face of the disc on one side in a second direction, being a radial direction of the disc and being orthogonal to the first direction, until the disc reaches the third position from the first position. The roller support mechanism supports the roller such that the roller is in contact with the transferred disc and is moveable in the first direction and the second direction. The first retaining member extends in the first direction, and is brought into contact with the radial end face of the disc on the other side in the second direction until the disc reaches at least the second position from the first position. The second retaining member is brought into contact with the radial end face of the disc on the other side in the second direction until the disc reaches the third position from the second position. The retaining member support mechanism supports the second retaining member such that the second retaining member is in contact with the transferred disc and is moveable in the first direction and the second direction.

According to the disc transfer device of the present disclosure, pickup of a disc is achieved without a slip on an end face of the disc. Accordingly, the disc is securely transferred in a radial direction of the disc.

BRIEF DESCRIPTION OF DRAWINGS

FIG. 1A is a side view schematically illustrating a disc transfer device according to an exemplary embodiment in a state that each of a plurality of discs is disposed at a disc standby position.

FIG. 1B is a side view schematically illustrating the disc transfer device according to the exemplary embodiment in a state that a single disc is disposed at a disc delivery position (first position).

FIG. 1C is a side view schematically illustrating the disc transfer device according to the exemplary embodiment in a state that the single disc is disposed at a disc record/reproduction position (third position).

DETAILED DESCRIPTION

Figure 2A:
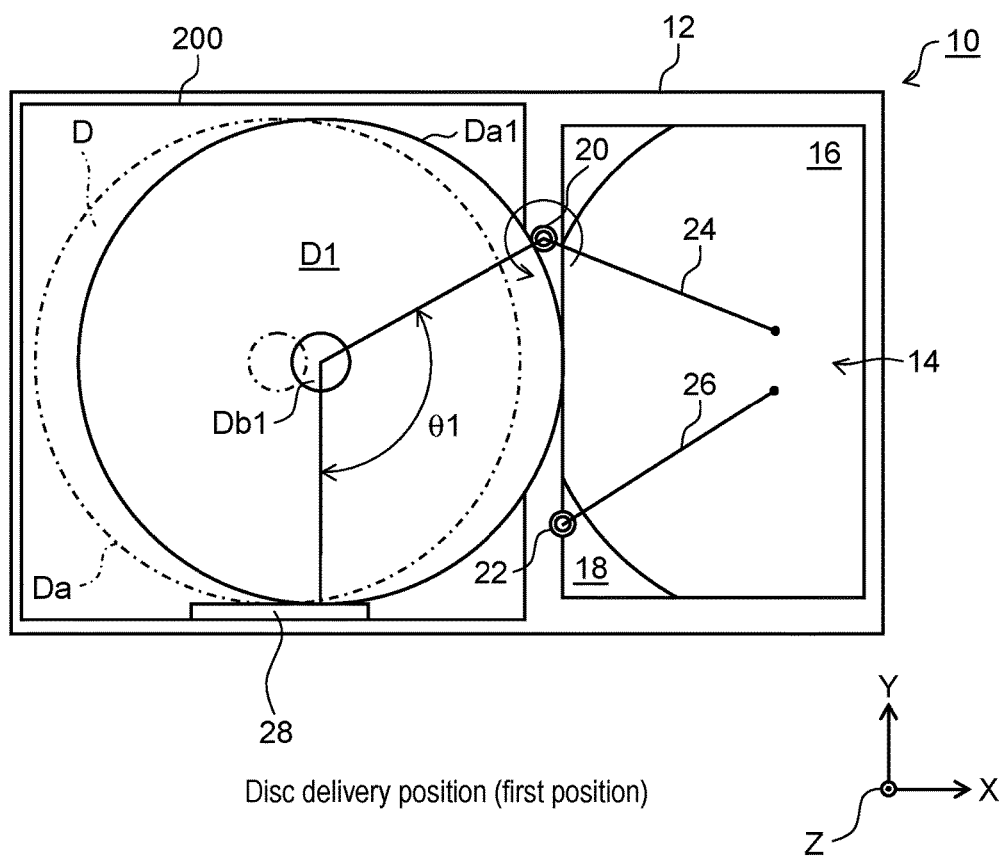
FIG. 2A is a top view schematically illustrating the disc transfer device according to the exemplary embodiment in the state that the single disc is disposed at the disc delivery position (first position).

An exemplary embodiment is hereinafter described in detail with reference to the drawings where appropriate. However, excessively detailed description may be omitted. For example, detailed description of well-known matters, and repetitive description of substantially identical configurations may be omitted. These omissions are made to avoid unnecessary redundancy of following description, and help easy understanding by those skilled in the art.

The drawings and following description have been presented by the inventors not to impose any limitations on the subject matters of the appended claims, but to only help those skilled in the art fully understand the exemplary embodiment.

In the description of this specification, an X axis direction, a Y axis direction, and a Z axis direction crossing each other at a right angle have been defined for easy understanding of a disc transfer device. The X axis direction (first direction) corresponds to a radial direction of a disc and a transfer direction of the disc. The Y axis direction (second direction) corresponds to a radial direction of the disc and a direction being orthogonal to the transfer direction of the disc. The Z axis direction corresponds to a thickness direction (third direction) of the disc.

It should be noted that each of the X axis direction, the Y axis direction, and the Z axis direction does not necessarily coincide with a vertical direction or a horizontal direction. For example, the Z axis direction does not necessarily coincide with the vertical direction.

Initially, an outline of a disc transfer device according to an exemplary embodiment is described to help easy understanding.

FIGS. 1A, 1B, and 1C are side views schematically illustrating the disc transfer device according to the exemplary embodiment, as views for brief description of configurations and operations of the disc transfer device.

FIG. 1A illustrates a state that a plurality of discs D are disposed at a disc standby position. FIG. 1B illustrates a state that single disc D1 contained in the plurality of discs D and corresponding to a record/reproduction target is disposed at a disc delivery position (first position). FIG. 1C illustrates a state that record/reproduction target disc D1 is disposed at a disc record/reproduction position (third position).

Disc transfer device 10 includes body 12, disc record/reproduction unit 14 which records information in discs D or reproduces discs D, and magazine 200 which stores the plurality of discs D.

Magazine 200 is configured such that the plurality of discs D stored in magazine 200 form a line in the disc thickness direction (Z axis direction). Magazine 200 is detachably attached to body 12 of disc transfer device 10 in the X axis direction corresponding to the disc radial direction, i.e., crossing the Z axis direction at a right angle. As illustrated in FIG. 1A, each of the plurality of discs D is disposed at the disc standby position within disc transfer device 10 in a state that magazine 200 is attached to disc transfer device 10. The disc standby position in this context is a position where discs D wait until a time of record or reproduction by disc record/reproduction unit 14. Magazine 200 is attachable or detachable to and from body 12 when disc record/reproduction unit 14 is located at an initial position, i.e., a position nearest to a negative end in the Z axis direction.

Disc record/reproduction unit 14 of disc transfer device 10 faces magazine 200 in the X axis direction when magazine 200 is attached to body 12. Disc record/reproduction unit 14 is shiftable in the Z axis direction. Disc record/reproduction unit 14 is therefore allowed to face, in the X direction, single record/reproduction target disc D1 in the plurality of discs D disposed at the disc standby positions in a line in the Z axis direction.

Disc record/reproduction unit 14 further includes disc transfer mechanism 16 which transfers record/reproduction target disc D1 in the X axis direction, and pickup unit 18 which records information in disc D1, or reproduces disc D1. Pickup unit 18 includes spindle 18a.

Figure 2B:
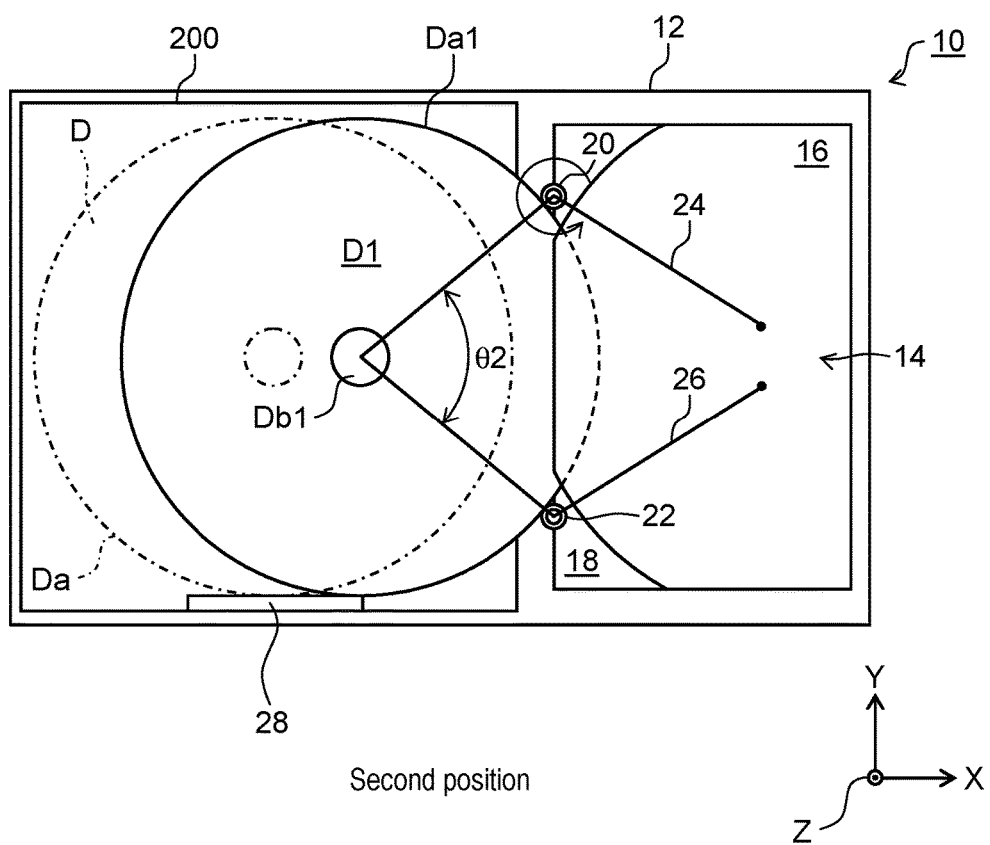
FIG. 2B is a top view schematically illustrating the disc transfer device according to the exemplary embodiment in a state that the single disc is disposed at a second position.
Figure 2C:
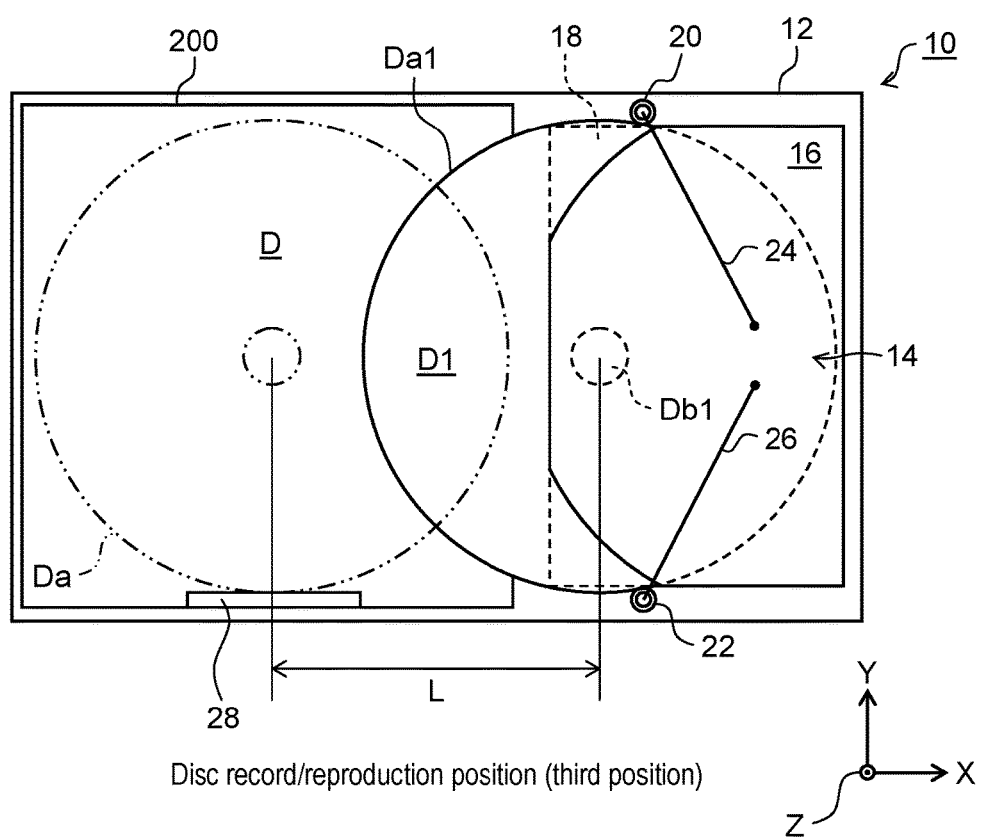
FIG. 2C is a top view schematically illustrating the disc transfer device according to the exemplary embodiment in the state that the single disc is disposed at the disc record/reproduction position (third position).

FIGS. 2A, 2B, and 2C are top views schematically illustrating disc transfer device 10 as views for describing disc transfer mechanism 16 included in the disc transfer device according to the exemplary embodiment. FIG. 2A illustrates the state that the single disc is disposed at the disc delivery position (first position). FIG. 2B illustrates a state that the single disc is disposed at a second position. FIG. 2C illustrates the state that the single disc is disposed at the disc record/reproduction position (third position).

Disc transfer mechanism 16 included in disc record/reproduction unit 14 is configured to load record/reproduction target disc D1 into pickup unit 18. More specifically, disc transfer mechanism 16 is configured to transfer disc D1 to the positive side in the X axis direction toward the disc record/reproduction position for record or reproduction of the disc in a state that radial end face Da1 of disc D1 is held by disc transfer mechanism 16.

Disc transfer mechanism 16 thus configured includes rollers 20, 22 for holding end face Da1 of record/reproduction target disc D1, and arms 24, 26 for supporting rollers 20, 22, respectively.

For example, roller 20 is a roller whose outer circumferential surface brought into contact with end face Da1 of record/reproduction target disc D1 is covered with an elastic material such as rubber. Roller 20 is rotatably driven by a driving source such as a motor (not illustrated) to rotate around a rotation center axis extending in the Z axis direction. Roller 20 supported by arm 24 is further brought into contact with end face Da1 of disc D1 on the positive side in the Y axis direction with respect to a disc center.

For example, roller 22 is a roller whose outer circumferential surface brought into contact with end face Da1 of record/reproduction target disc D1 is covered with an elastic material such as rubber. Roller 22 functions as a retaining member (second retaining member) which retains disc D1 to maintain contact between roller 20 and disc D1. Roller 22 having this function is configured to hold disc D1 in cooperation with roller 20. Roller 22 supported by arm 26 is brought into contact with end face Da1 of disc D1 on the negative side in the Y axis direction with respect to the disc center.

Each of arms 24, 26 provided on disc transfer mechanism 16 is freely revolvable around a revolution center axis extending in the Z axis direction. Free ends of respective arms 24, 26 are configured to support rollers 20, 22, respectively. Respective arms 24, 26 therefore support rollers 20, 22 by shifting in the X axis direction and the Y axis direction. Arm 24 maintains contact between roller 20 and disc D1, and functions as a roller support mechanism for supporting roller 20 by shifting in the X axis direction and the Y axis direction. On the other hand, arm 26 maintains contact between roller 22, which corresponds to the retaining member, and disc D1, and functions as a roller support mechanism for supporting roller 22 by shifting in the X axis direction and the Y axis direction.

As illustrated in FIG. 2B, roller 20 rotates and rolls on end face Da1 of record/reproduction target disc D1 in the state of contact between roller 20 and end face Da1 of disc D1 on the positive side in the Y axis direction, and in the state of contact between roller 22 and end face Da1 of disc D1 on the negative side in the Y axis direction. Accordingly, arms 24, 26 revolve in such a direction that a distance between rollers 20, 22 increases. In accordance with this revolution, rollers 20, 22 shift toward the positive side in the X axis direction while holding disc D1. As a result, disc D1 is transferred to a position above pickup unit 18 toward the positive side in the X axis direction. As illustrated in FIGS. 1C and 2C, disc D1 thus transferred comes to the disc record/reproduction position between disc transfer mechanism 16 and pickup unit 18, where pickup unit 18 records information in disc D1, or reproduces disc D1.

As illustrated in FIGS. 1B and 2A, rollers 20, 22 of disc transfer mechanism 16 are configured to receive single record/reproduction target disc D1 in a state that a part of disc D1 protrudes to the positive side in the X axis direction (disc record/reproduction unit 14 side) from the plurality of discs D disposed in a line in the Z axis direction. This configuration will be detailed below.

Magazine 200 of disc transfer device 10 is a compact component which stores the plurality of discs D in a line in the Z axis direction. When the plurality of discs D are stored in magazine 200 in a line in the Z axis direction with a smallest possible distance left between each of discs D, other discs D may be simultaneously held by rollers 20, 22 which holds end face Da1 of record/reproduction target disc D1 drawn from the plurality of discs D disposed close to each other in the Z axis direction.

Accordingly, disc transfer device 10 is configured to slide record/reproduction target disc D1 to allow record/reproduction target disc D1 to protrude to the positive side (disc record/reproduction unit 14 side) in the X axis direction from other discs D as illustrated in FIGS. 1B and 2A. This configuration will be detailed below. By this sliding, record/reproduction target disc D1 comes to the disc delivery position between the disc standby position and the disc record/reproduction position.

As a result, roller 20 of disc transfer mechanism 16 is brought into contact with end face Da1 of record/reproduction target disc D1 disposed at the disc delivery position without being brought into contact with other discs D. In other words, roller 20 holds only record/reproduction target disc D1 in cooperation with rubber guide member 28.

When record/reproduction target disc D1 is disposed at the disc delivery position, roller 20 is brought into contact with end face Da1 of disc D1 as illustrated in FIG. 2A. However, roller 22 is not brought into contact with end face Da1 of disc D1. Instead, rubber guide member 28 (first retaining member) provided on magazine 200 is brought into contact with end face Da1 of disc D1.

As illustrated in FIGS. 2B and 2C, record/reproduction target disc D1 is transferred while held by rollers 20, 22. When only roller 20 is brought into contact with end face Da1 of disc D1 as illustrated in FIG. 2A, disc D1 is difficult to transfer from the disc delivery position to the disc record/reproduction position. Accordingly, a shift of disc D1 until contact with roller 22 is needed. Rubber guide member 28 is therefore provided to transfer disc D1 until contact with roller 22.

Rubber guide member 28 is a component made of an elastic material, such as rubber, extending in the X axis direction. Rubber guide member 28 is brought into contact with end face Da1 of record/reproduction target disc D1 on the negative side in the Y axis direction with respect to the disc center. More specifically, rubber guide member 28 is brought into contact with end face Da1 of disc D1 at a longer distance from the center of disc D1 in the Y axis direction than a corresponding distance of roller 22.

In addition, rubber guide member 28 extends in the X axis direction by a length sufficient for maintaining contact with disc D1 from the disc delivery position (first position) for a start of contact between record/reproduction target disc D1 and roller 20, to at least the position for a start of contact between disc D1 and roller 22 (second position).

As illustrated in FIG. 2A, roller 20 rotates in the state of contact between rubber guide member 28 thus configured and end face Da1 of record/reproduction target disc D1 on the negative side in the Y axis direction, and in the state of contact between roller 20 and end face Da1 of disc D1 on the positive side in the Y axis direction. In accordance with this rotation, roller 20 rolls on end face Da1 of disc D1, whereby disc D1 is guided by rubber guide member 28 and transferred toward the positive side in the X axis direction (toward disc record/reproduction unit 14 side). Disc D1 thus transferred comes to the second position of contact with both rollers 20 and 22 as illustrated in FIG. 2B. Thereafter, disc D1 is transferred to the disc record/reproduction position (third position) by rollers 20 and 22 as illustrated in FIG. 2B.

Discussed hereinafter is a reason for the shift of record/reproduction target disc D1 from the disc delivery position (first position) to at least the second position by use of rubber guide member 28 instead of roller 22. A disc transfer device of a comparison example is presented herein to help understanding of this reason.

Figure 3:
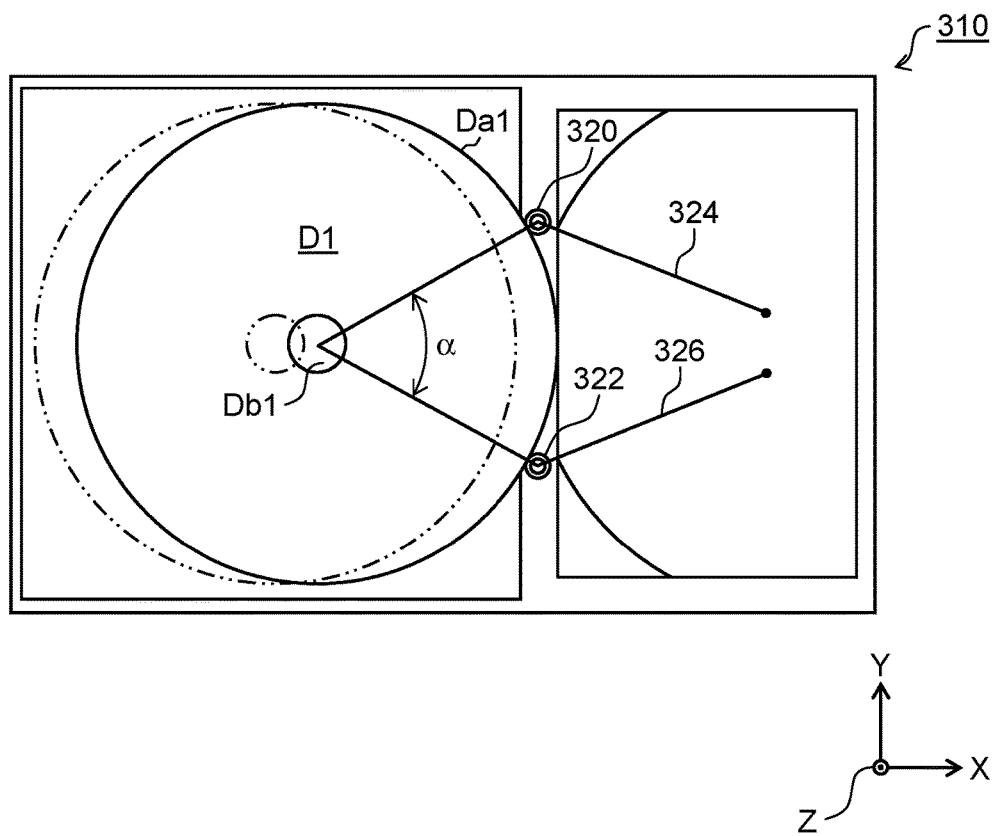
FIG. 3 is a top view schematically illustrating a disc transfer device according to a comparative example.

FIG. 3 is a top view schematically illustrating the disc transfer device according to the comparative example.

According to disc transfer device 310 in the comparative example illustrated in FIG. 3, record/reproduction target disc D1 is transferred by rollers 320, 322 from the disc delivery position to the disc record/reproduction position. FIG. 3 illustrates a state that disc D1 is located at the disc delivery position with contact between rollers 320 and 322 and end face Da1 of disc D1. In other words, FIG. 3 illustrates a state that rollers 320, 322 initiate picking up disc D1 at the disc delivery position.

With rotation of roller 320, and resultant revolution of arms 324, 326 in such a direction that a distance between rollers 320, 322 increases, record/reproduction target disc D1 is transferred toward the disc record/reproduction position (to the positive side in the X axis direction).

However, when a friction coefficient of end face Da1 of record/reproduction target disc D1 is small, i.e., when disc D1 is coated with a material having a small friction coefficient, for example, disc D1 disposed at the disc delivery position may be difficult to pick up by rollers 320, 322, and therefore difficult to transfer.

This problem is caused by a short distance between rollers 320, 322 at the time of pickup of end face Da1 of record/reproduction target disc D1 as illustrated in FIG. 3. More specifically, this problem is caused by a small angle α (hereinafter referred to as "pickup angle") formed by a line connecting the disc center and a contact point between roller 320 and disc D1, and a line connecting the disc center and a contact point between roller 322 and disc D1.

One of possible solutions to this problem is to increase the distance between rollers 320, 322 at the start of pickup of disc D1 (i.e., at the time of contact with disc D1 at the disc delivery position) to increase pickup angle α to an angle sufficient for picking up end face Da1 of record/reproduction target disc D1 by rollers 320, 322. In this case, however, a transfer distance of disc D1 in the X axis direction by rollers 320, 322 after pickup of disc D1 by rollers 320, 322 decreases.

According to the present exemplary embodiment, however, roller 20 and rubber guide member 28 are configured to pick up record/reproduction target disc D1 disposed at the disc delivery position at pickup angle θ1 larger than pickup angle α at which pickup failure of disc D1 may be caused, as illustrated in FIG. 2A. When roller 20 rotates in this state, disc D1 is transferred from the disc delivery position (first position) to the second position on the positive side in the X axis direction (disc record/reproduction unit 14 side) while entering between roller 20 and rubber guide member 28.

Furthermore, as illustrated in FIG. 2B, rollers 20, 22 pick up record/reproduction target disc D1 transferred from the disc delivery position (first position) to the second position, while forming pickup angle θ2 larger than pickup angle α at which pickup failure of disc D1 may be caused. With rotation of roller 20 in this state, disc D1 is transferred from the second position to the disc record/reproduction position (third position) on the positive side in the X axis direction while entering between rollers 20, 22.

When rubber guide member 28 and roller 22 are used in this manner, transfer of disc D1 is allowed from the disc delivery position (first position) to the disc record/reproduction position (third position) while maintaining a pickup angle larger than pickup angle α at which pickup failure of end face Da1 of record/reproduction target disc D1 may be caused. More specifically, disc D1 is allowed to shift by distance L without overlap between center hole Db1 of disc D1 and other discs D. As a result, center hole Db1 of disc D1 comes to a position above spindle 18a of pickup unit 18.

Pickup unit 18 is provided on disc record/reproduction unit 14 in a manner shiftable in the Z axis direction. Pickup unit 18 shifts toward record/reproduction target disc D1 disposed at the disc record/reproduction position to allow engagement between spindle 18a of pickup unit 18 and center hole Db1 of disc D1. Disc D1 is clamped by pickup unit 18 through this engagement. Thereafter, pickup unit 18 records information in disc D1, or reproduces disc D1 while rotating disc D1 via spindle 18a.

As illustrated in FIG. 1C, pickup unit 18 records information in record/reproduction target disc D1 or reproduces disc D1 in a state of overlap between a part of disc D1 and other discs D as viewed in the disc thickness direction (Z axis direction). Accordingly, reduction of a size of disc transfer device 10 is achievable particularly in the X axis direction.

As illustrated in FIG. 1B and 1C, disc transfer device 10 is configured to separate discs D2 located adjacent to record/reproduction target disc D1 toward the positive side and negative side in the Z axis direction from disc D1 during transfer of disc D1 toward disc record/reproduction unit 14. This configuration will be detailed below.

Description about the outline of disc transfer device 10 according to the exemplary embodiment is now completed. Discussed hereinbelow is a specific configuration for realizing disc transfer device 10 outlined above according to the exemplary embodiment.

Figure 4:
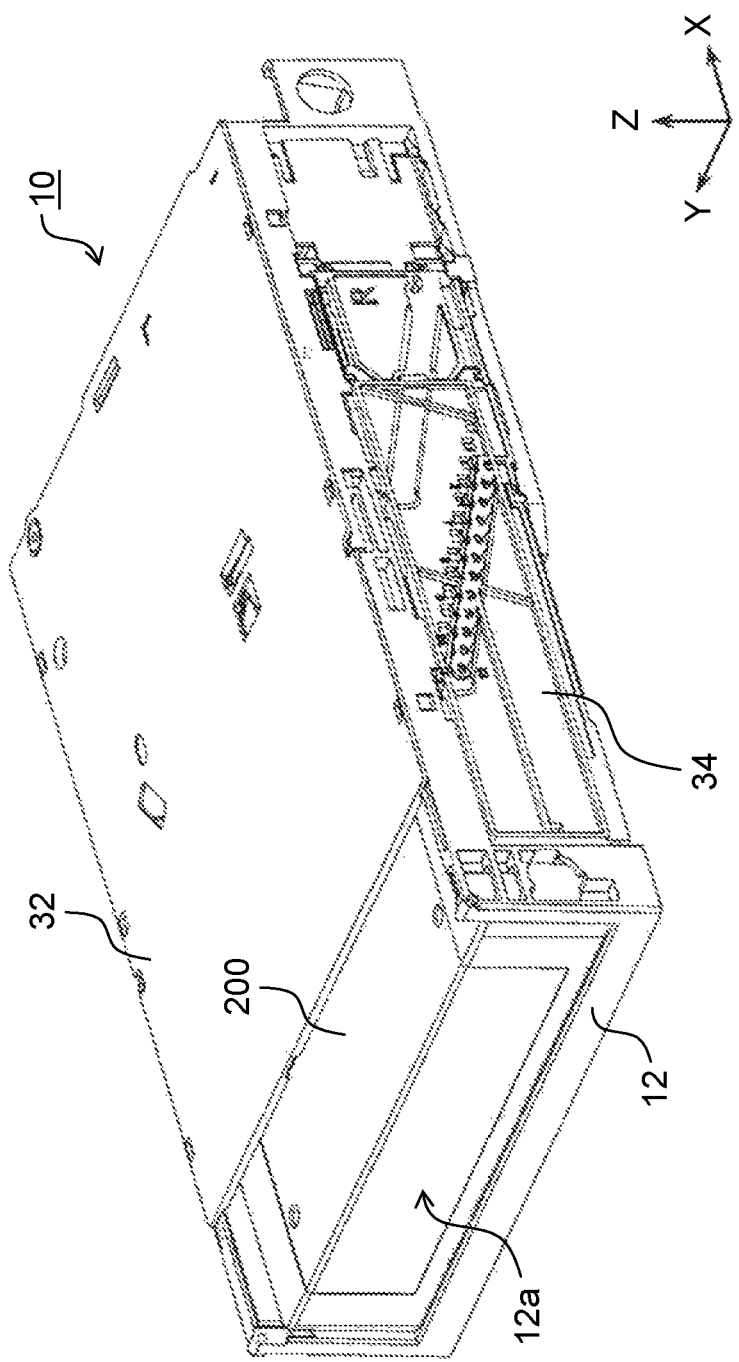
FIG. 4 is a perspective view of the disc transfer device to which a magazine is attached.

FIG. 4 illustrates disc transfer device 10 to which magazine 200 is attached.

As illustrated in FIG. 4, body 12 of disc transfer device 10 has a substantially rectangular parallelepiped shape, and includes opening 12a through which magazine 200 is drawn in and out in the X axis direction. Body 12 further includes plate-shaped top cover 32, and base casing 34 engaging with top cover 32 to form a space in which magazine 200 and disc record/reproduction unit 14 are accommodated.

Figure 5:
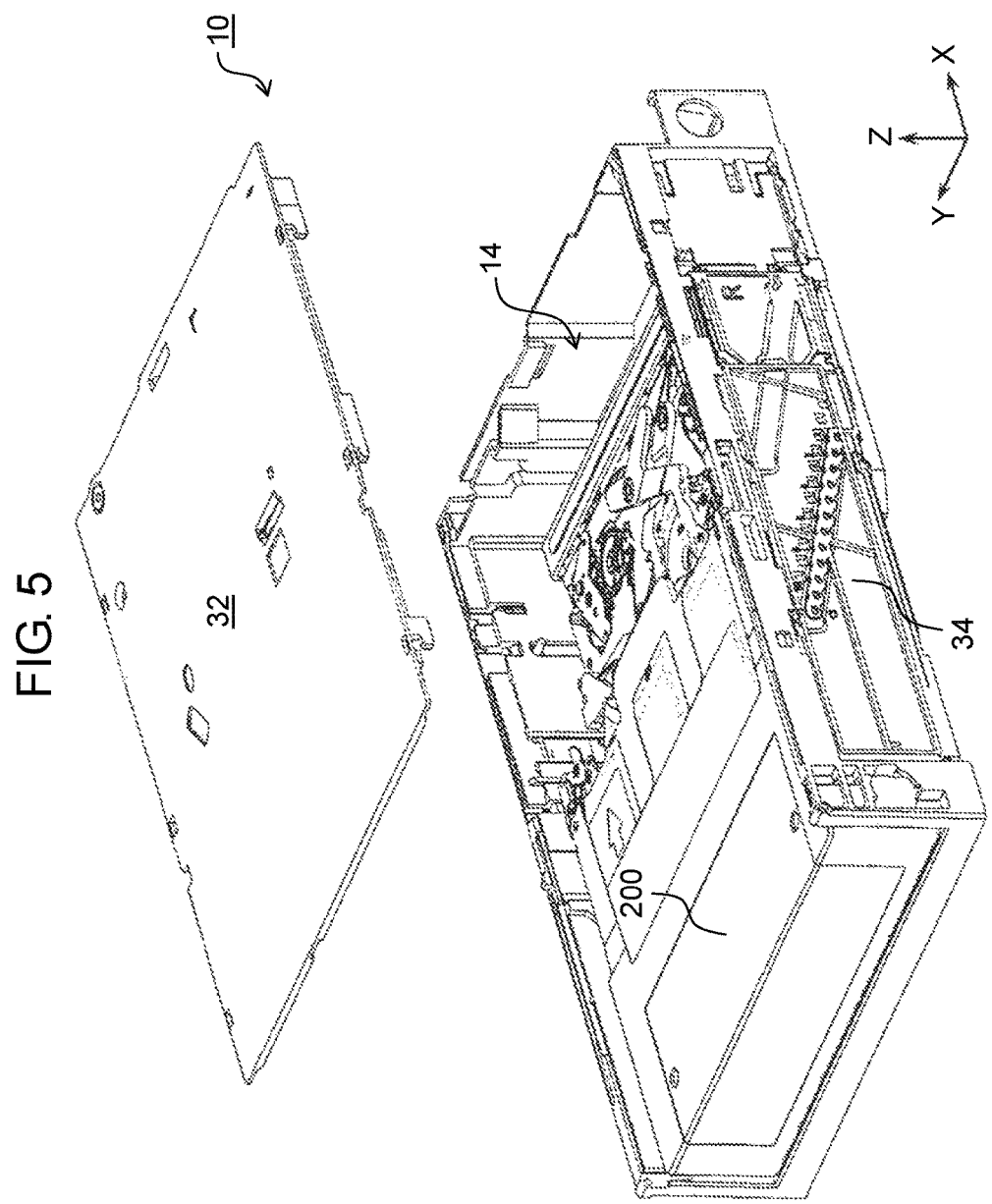
FIG. 5 is a perspective view of the disc transfer device from which a top cover is removed.
Figure 6:
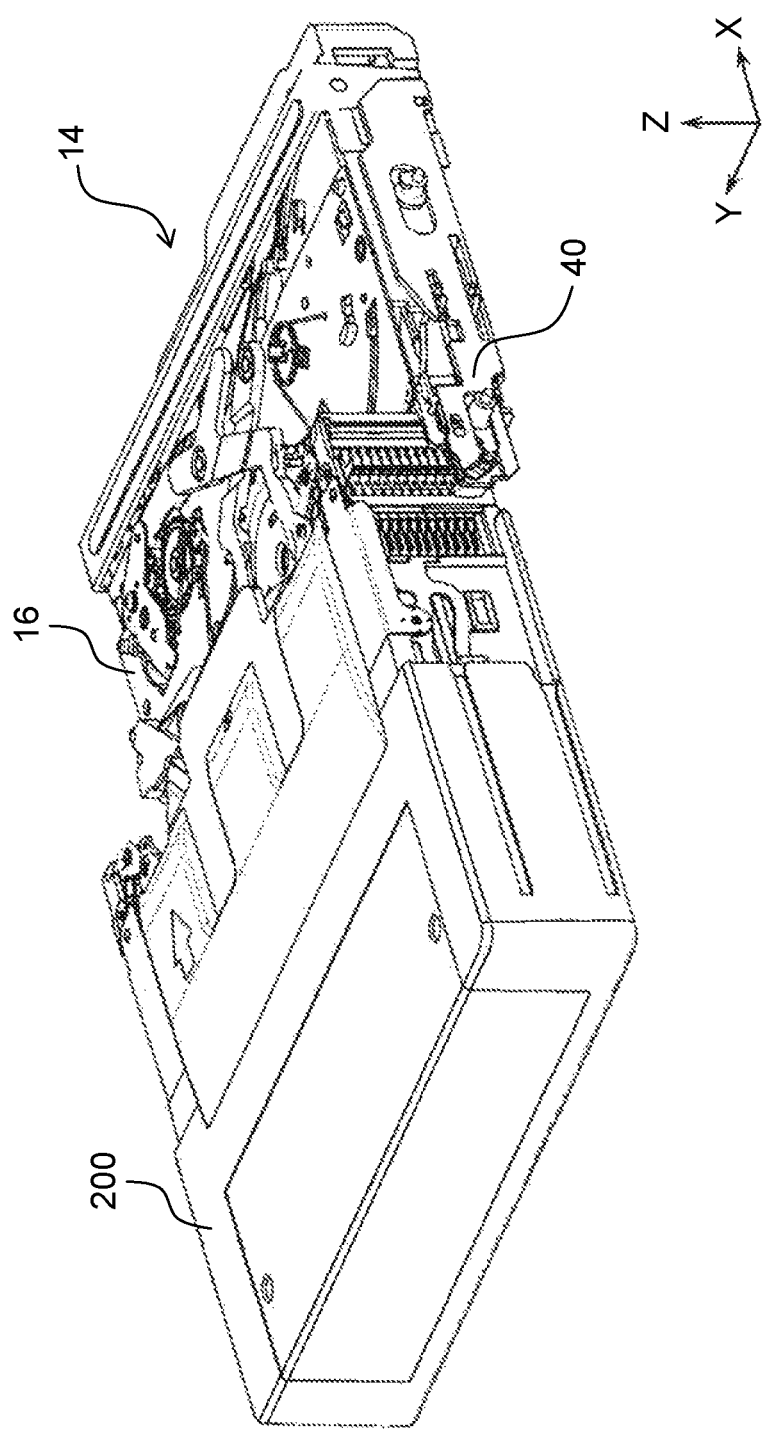
FIG. 6 is a perspective view illustrating the magazine and a disc record/reproduction unit.

FIG. 5 illustrates disc transfer device 10 from which top cover 32 is removed. FIG. 6 illustrates magazine 200 and disc record/reproduction unit 14.

As illustrated in FIGS. 5 and 6, magazine 200 and disc record/reproduction unit 14 attached to disc transfer device 10 face each other in the X axis direction. Disc record/reproduction unit 14 is supported by base casing 34 of body 12 in a manner shiftable in the Z axis direction.

Figure 7:
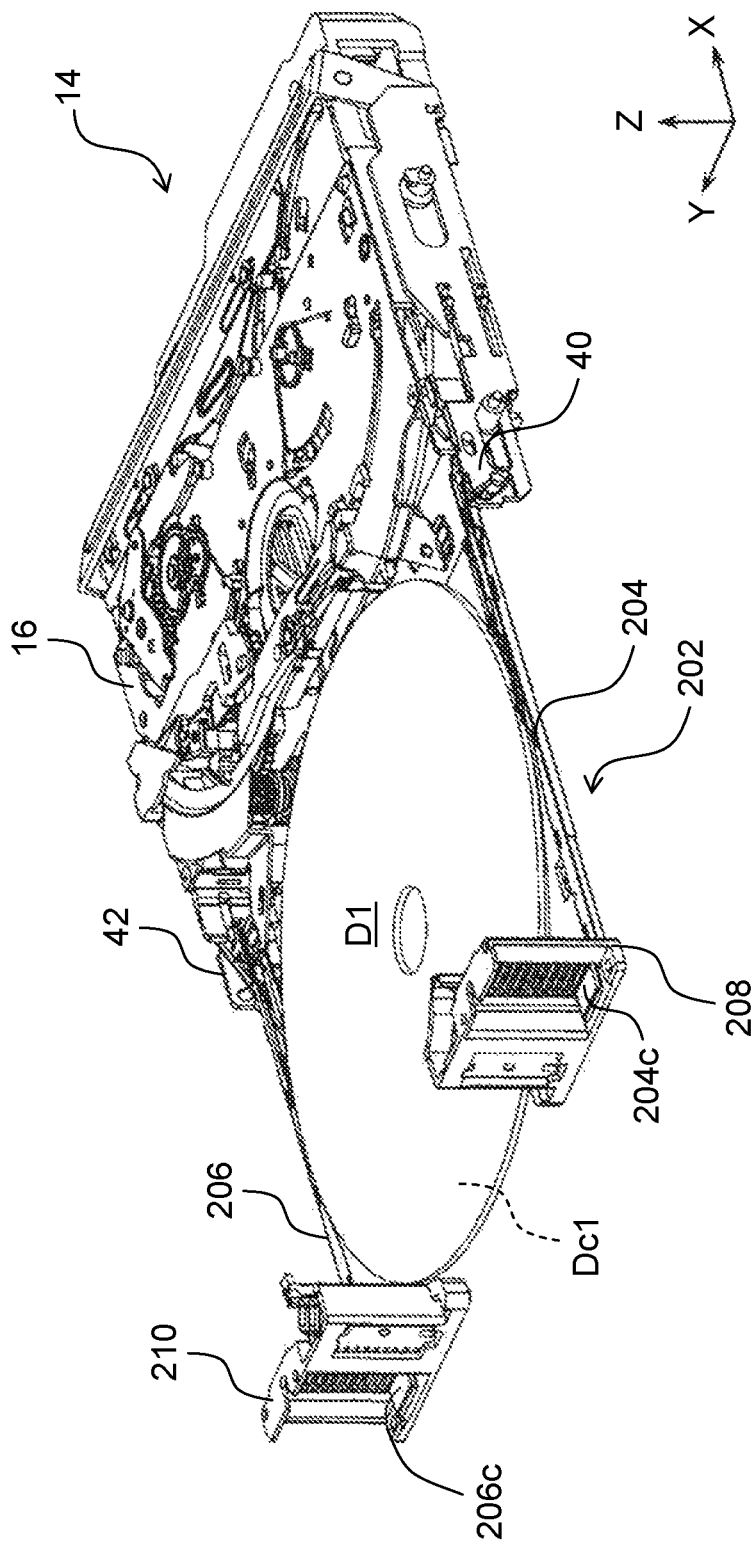
FIG. 7 is a perspective view illustrating record/reproduction target disc D1 and the disc record/reproduction unit.

FIG. 7 illustrates record/reproduction target disc D1 and disc record/reproduction unit 14.

As illustrated in FIG. 7, each of discs D disposed in magazine 200 in a line in the Z axis direction is supported by disc holder 202 (disc hold member). Disc holder 202 holding single disc D is constituted by thin-plate-shaped disc hold plates 204, 206 corresponding to two split portions in the Y axis direction.

Figure 8:
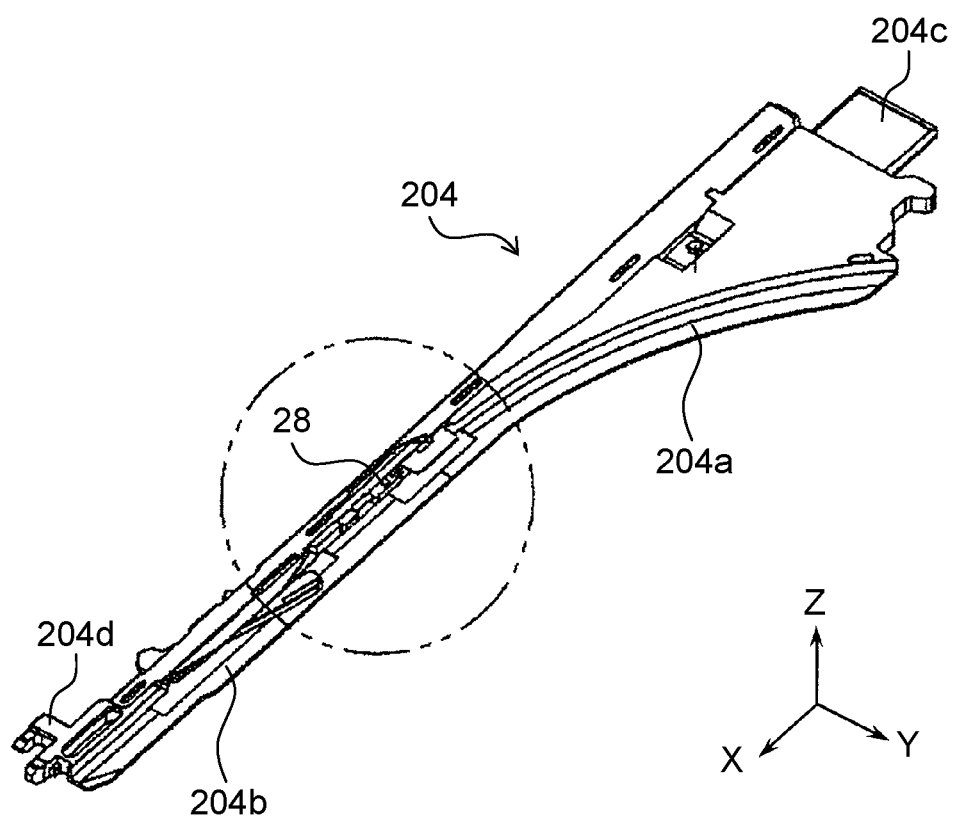
FIG. 8 is a perspective view of one of disc hold plates of a disc holder.
Figure 9:
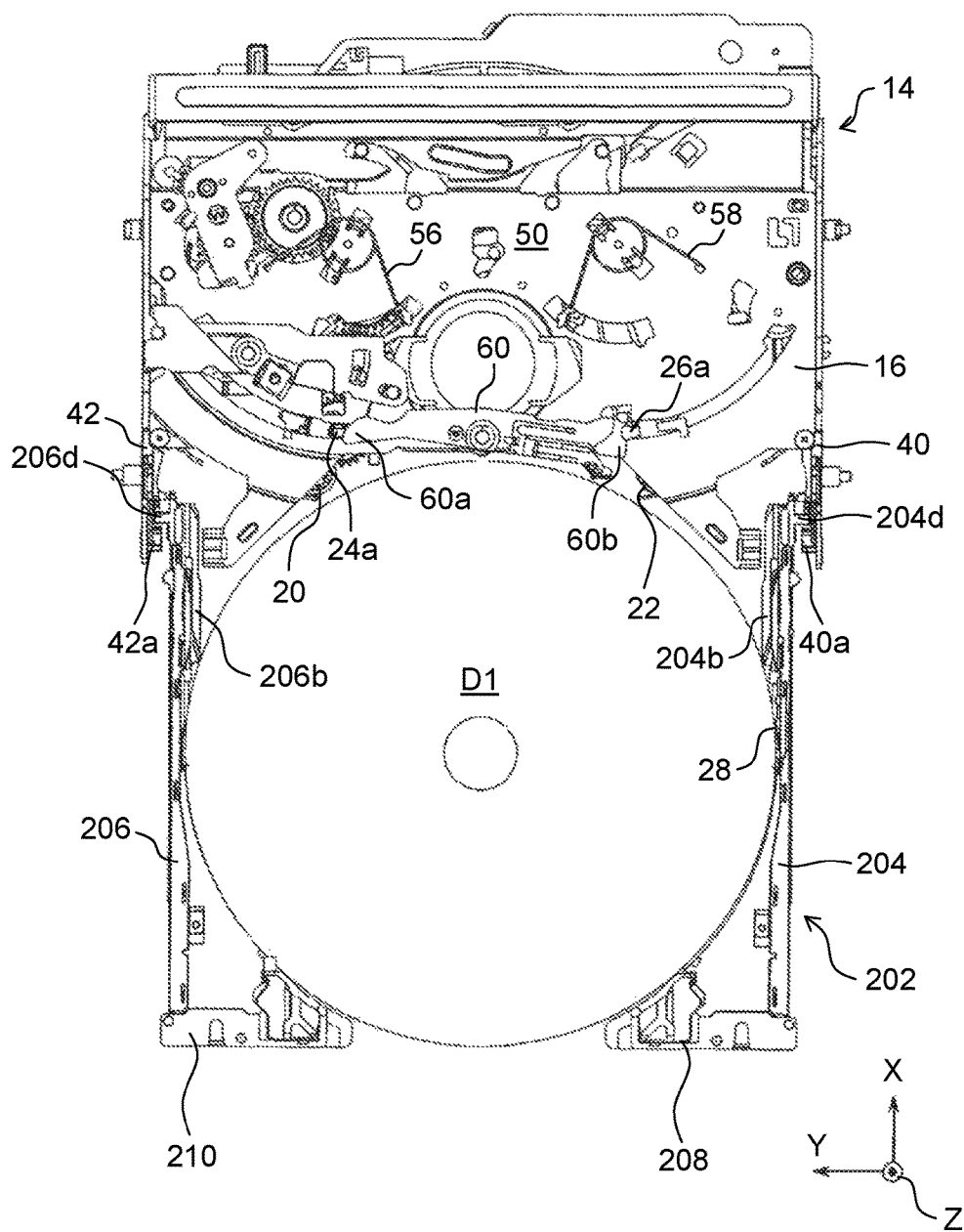
FIG. 9 is a top view of record/reproduction target disc D1 and the disc record/reproduction unit.
Figure 10:
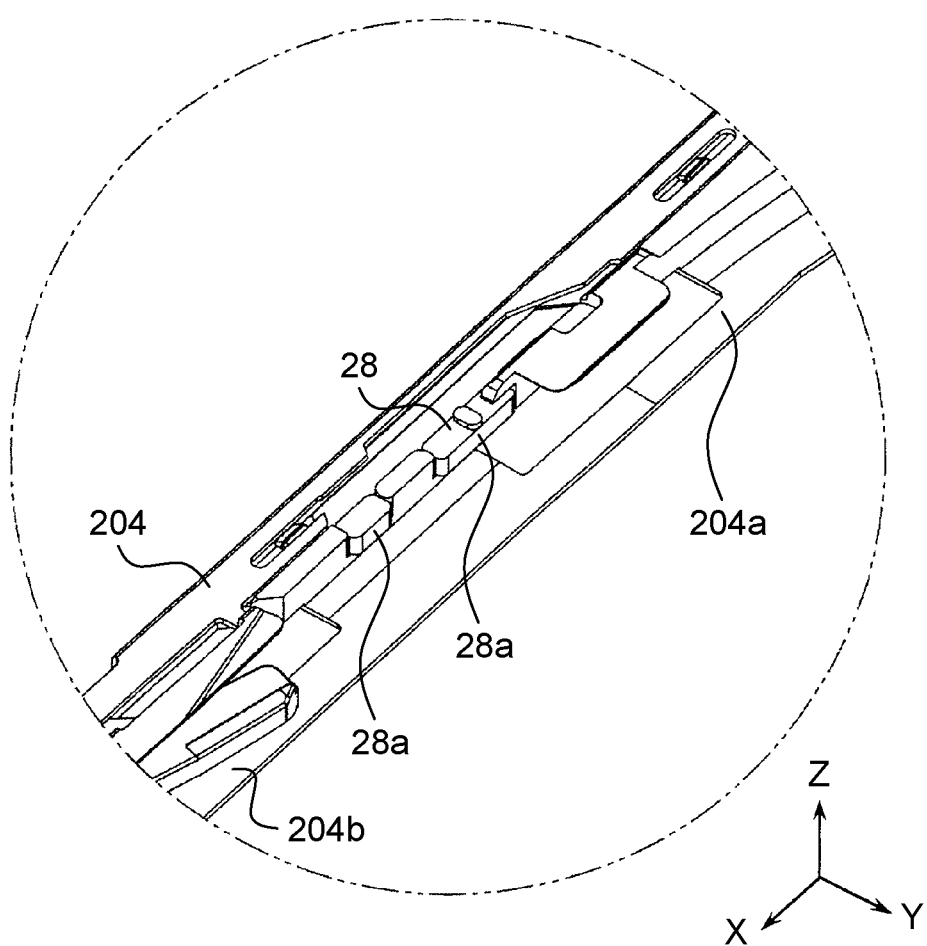
FIG. 10 is a partial enlarged view of one of the disc hold plates.
Figure 11:
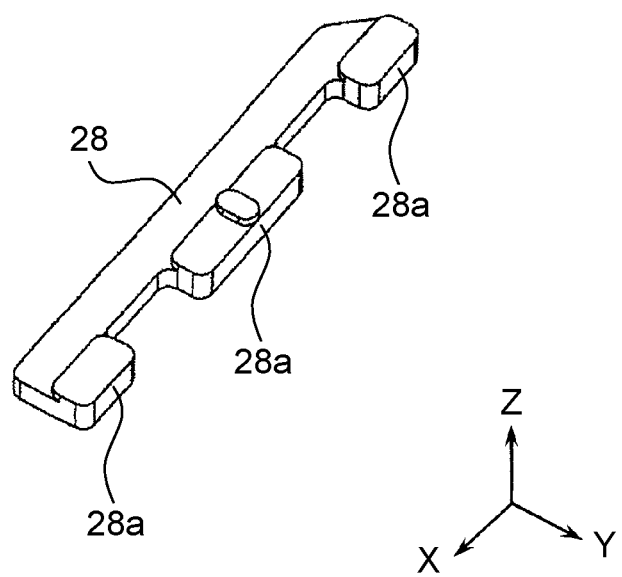
FIG. 11 is a perspective view of a rubber guide member.

FIG. 8 illustrates disc hold plate 204 of disc holder 202. FIG. 9 illustrates disc holder 202 (disc hold plates 204, 206) holding disc D at the disc standby position, and disc record/reproduction unit 14. FIG. 10 is a partial enlarged view of one of the disc hold plates. FIG. 11 is a perspective view of the rubber guide member.

Each of disc hold plates 204, 206 of disc holder 202 has a thin plate shape, and holds disc D in a manner slidable toward the positive side in the X axis direction (disc record/reproduction unit 14 side). Respective disc hold plates 204, 206 of disc holder 202 have symmetrical shapes with respect to a Z-X plane.

More specifically, as illustrated in FIG. 8, disc hold plate 204 includes disc support portion 204a which supports disc D when disc D is disposed at the disc standby position illustrated in FIG. 1A. Disc support portion 204a supports an outer edge of rear face Dc of disc D on a far side from disc record/reproduction unit 14 (negative side in the X axis direction with respect to the disc center).

As illustrated in FIG. 8, disc hold plate 204 further includes disc guide portion 204b which guides disc D when disc D is transferred toward the disc record/reproduction position illustrated in FIG. 1C. More specifically, disc guide portion 204b guides disc D while facing the outer edge of rear face Dc of disc D.

Disc hold plate 206 includes a not-illustrated disc hold portion and disc guide portion 206b (see FIG. 9) similarly to disc hold plate 204.

As illustrated in FIGS. 8 and 9, disc hold plate 204 further includes rubber guide member 28. Rubber guide member 28 attached to disc hold plate 204 is configured to be brought into contact with end face Da of disc D.

As illustrated in FIGS. 10 and 11, rubber guide member 28 is a component extending in the X axis direction, and includes contact face 28a brought into contact with end face Da of disc D held by disc hold plates 204, 206. Rubber guide member 28 has such a length in the X axis direction sufficient for being brought into contact with record/reproduction target disc D1 waiting at the disc standby position at least until contact between disc D1 and rollers 20, 22 of disc transfer mechanism 16 as illustrated in FIG. 2B.

As illustrated in FIG. 7, each of disc hold plates 204, 206 of disc holder 202 is supported by magazine 200 in a manner slidable in the X axis direction, and such that a distal end portion of each of disc hold plates 204, 206 on the disc record/reproduction unit 14 side (positive side in the X axis direction) is shiftable in the Z axis direction. More specifically, disc hold plates 204, 206 are held by plate hold members 208, 210 corresponding to a part of magazine 200, respectively, such that distal end portions 204c, 206c of disc hold plates 204, 206 on the negative side in the X axis direction are slidable in the X axis direction, and such that distal ends of disc hold plates 204, 206 on the positive side in the X axis direction are shiftable in the Z axis direction. Accordingly, disc hold plates 204, 206 held by plate hold members 208, 210 are allowed to swing in the Z axis direction around distal ends 204c, 206c.

In the state that disc hold plates 204, 206 are supported by magazine 200 in a manner slidable in the X axis direction, record/reproduction target disc D1 held by disc hold plates 204, 206 is allowed to reach the disc delivery position (first position) as illustrated in FIGS. 1B and 2A. More specifically, disc D1 is shiftable to allow a part of disc D1 to protrude from other discs D toward the positive side in the X axis (disc record/reproduction unit 14 side). In this case, roller 20 of disc transfer mechanism 16 is brought into contact with end face Da1 of disc D1 without contact with other discs D as illustrated in FIG. 2A. Accordingly, roller 20 is capable of holding and transferring disc D1 in cooperation with rubber guide member 28 of disc hold plate 204 holding disc D1.

In addition, in the state that disc hold plates 204, 206 are supported by magazine 200 in a manner swinging in the Z axis direction around distal ends 204c, 206c of disc hold plates 204, 206, discs D2 located adjacent to record/reproduction target disc D1 are separable from disc D1 as illustrated in FIGS. 1B and 1C. Accordingly, contact between disc D1 targeted for record or reproduction by pickup unit 18 at the disc record/reproduction position, and discs D2 adjacent to disc D1 is avoidable as illustrated in FIG. 1C.

As illustrated in FIGS. 7 and 9, disc holder shift mechanisms (disc hold member shift mechanisms) 40, 42 are provided on disc record/reproduction unit 14. Disc holder shift mechanisms 40, 42 slide disc hold plates 204, 206 of disc holder 202 holding record/reproduction target disc D1 toward the positive side in the X axis direction (disc record/reproduction unit 14 side).

Disc holder shift mechanisms 40, 42 are plate-shaped members, and are disposed on one and the other sides of disc record/reproduction unit 14 in the Y axis direction, respectively. Disc holder shift mechanisms 40, 42 are supported by disc record/reproduction unit 14 in a manner slidable in the X axis direction.

As illustrated in FIG. 9, disc holder shift mechanisms 40, 42 further include cams 40a, 42a protruding in the Y axis direction and separably engaging with disc hold plates 204, 206. Cams 40a, 42a engage with protrusions 204d, 206d formed on disc hold plates 204, 206 on the positive side in the X axis direction (disc record/reproduction unit 14 side) (see FIG. 8).

When disc holder shift mechanisms 40, 42 shift toward the positive side in the X axis direction, cams 40a, 42a of disc holder shift mechanisms 40, 42 engage with protrusions 204d, 206d of disc hold plates 204, 206 holding record/reproduction target disc D1 to press protrusions 204d, 206d toward the positive side in the X axis direction. As a result, disc hold plates 204, 206 holding record/reproduction target disc D1 shift to the positive side in the X axis direction, whereby disc D1 is transferred to the disc delivery position illustrated in FIGS. 1B and 2A.

When record/reproduction target disc D1 is located at the disc standby position, i.e., when the plurality of discs D stored in magazine 200 are disposed in a line in the Z axis direction, protrusions 204d, 206d of the plurality of disc hold plates 204, 206 holding discs D are also disposed in a line in the Z axis direction.

Cam 40a enters between protrusions 204d of two disc hold plates 204 located adjacent to disc hold plate 204 of record/reproduction target disc D1 while pressing protrusion 204d of disc hold plate 204 of record/reproduction target disc D1. Similarly, cam 42a enters between protrusions 206d of two disc hold plates 206 located adjacent to disc hold plate 206 of record/reproduction target disc D1. In this case, two adjoining sets of disc hold plates 204, 206 are separated from disc hold plates 204, 206 of disc D1. As a result, adjoining two discs D2 are separated from record/reproduction target disc D1 as illustrated in FIGS. 1B and 1C.

As illustrated in FIG. 9, disc transfer mechanism 16 includes base plate 50. Constituent elements of disc transfer mechanism 16, such as gears for rotating arms 24, 26 and roller 20, are mounted on base plate 50. Arms 24, 26 are disposed on the rear side of base plate 50 in such positions as to face pickup unit 18. Accordingly, arms 24, 26 are invisible behind base plate 50 in FIG. 9.

Figure 12:
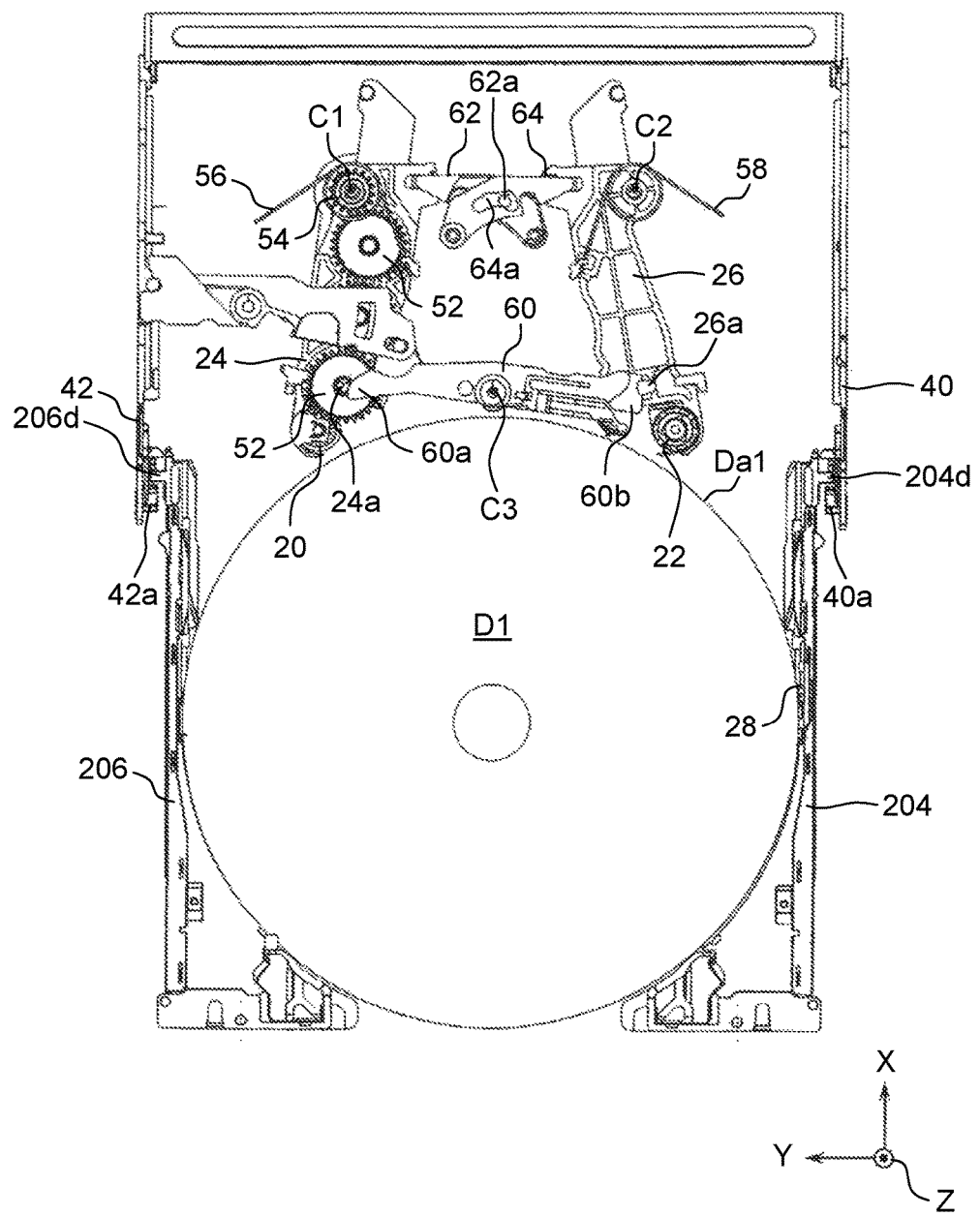
FIG. 12 as a view corresponding to FIG. 9 is a top view of record/reproduction target disc D1 and a part of the disc record/reproduction unit, showing constituent elements associated with rollers and arms.

FIG. 12 as a view corresponding to FIG. 9 illustrates rollers 20, 22, arms 24, 26 supporting rollers 20, 22, and associated constituent elements, but does not illustrates other constituent elements of disc record/reproduction unit 14.

As illustrated in FIG. 12, rollers 20, 22 are not brought into contact with record/reproduction target disc D1 until disc D1 comes to the disc delivery position.

A plurality of gears 52 provided for rotatably driving roller 20 are mounted on arm 24 which supports roller 20 as illustrated in FIG. 12. The plurality of gears 52 are driven by driving gear 54 rotating around a rotation center axis coinciding with revolution center axis C1 of arm 24. Driving gear 54 is rotatably driven by a motor (not illustrated). Accordingly, roller 20 is rotatably driven via driving gear 54 and the plurality of gears 52.

Arms 24, 26 are urged by torsion springs 56, 58 (first and second urging members). More specifically, arms 24, 26 are urged by torsion springs 56, 58 in such directions that rollers 20, 22 supported by arms 24, 26 come close to each other.

As illustrated in FIG. 12, arm stopper member 60 is provided to avoid contact between record/reproduction target disc D1 and rollers 20, 22 of arms 24, 26 urged by torsion springs 56, 58 before disc D1 comes to the disc delivery position.

Arm stopper member 60 is supported by base plate 50 in a manner revolvable around revolution center axis C3 extending in the Z axis direction. Free end 60a of arm stopper member 60 is brought into contact with protrusion 24a of arm 24 to regulate revolution of arm 24 in a direction that roller 20 approaches disc D1. On the other hand, base plate 50 regulates revolution of arm 26 in a direction that roller 22 approaches disc D1. In this case, contact between rollers 20, 22 and record/reproduction target disc D1 is avoidable until disc D1 comes to the disc delivery position. Accordingly, disc record/reproduction unit 14 is allowed to shift in the Z axis direction to face, in the X axis direction, any one of the plurality of discs D disposed in a line in the Z axis direction.

Figure 13:
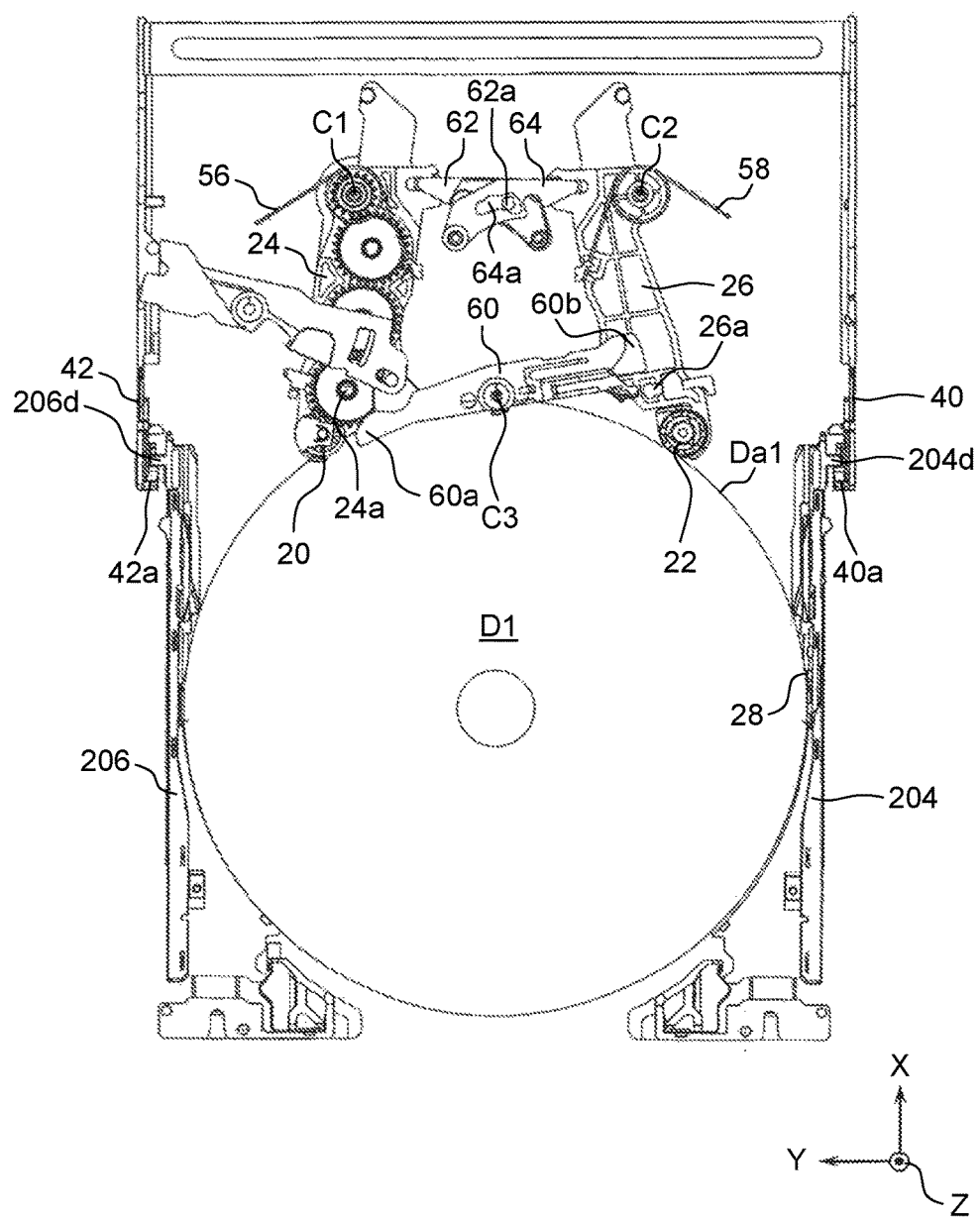
FIG. 13 is a top view of a part of the disc record/reproduction unit, showing a state that record/reproduction target disc D1 is disposed at the disc delivery position (first position).

FIG. 13 illustrates record/reproduction target disc D1 reaching the disc delivery position (first position) after sliding of disc hold plates 204, 206 by disc holder shift mechanisms 40, 42.

When record/reproduction target disc D1 is disposed at the disc delivery position as illustrated in FIG. 13, arm stopper member 60 swings. As a result, contact between free end 60a of arm stopper member 60 and protrusion 24a of arm 24 is released, and simultaneously contact between free end 60b and protrusion 26a of arm 26 is released.

When the contact between free end 60a of arm stopper member 60 and protrusion 24a of arm 24 is released, arm 24 is urged by torsion spring 56. Accordingly, roller 20 is brought into contact with end face Da1 of record/reproduction target disc D1 disposed at the disc delivery position with predetermined contact pressure. This contact allows disc D1 to be brought into contact with rubber guide member 28 of disc hold plate 204 with predetermined contact pressure. As a result, disc D1 is held by roller 20 and rubber guide member 28.

Even when engagement between free end 60b of arm stopper member 60 and protrusion 26a is released as illustrated in FIG. 13, roller 22 supported by arm 26 is not brought into contact with record/reproduction target disc D1. More specifically, arm 26 is urged by torsion spring 58, but revolution of arm 26 is regulated by base plate 50. In this case, roller 22 is not brought into contact with disc D1. While roller 22 appears to be brought into contact with disc D1 disposed at the disc delivery position in FIG. 13, roller 22 is not practically brought into contact with disc D1. More specifically, each of rollers 20, 22 is shaped to have a large-diameter portion provided at each end in the Z axis direction, and a small-diameter portion provided at a central portion and being brought into contact with end face Da1 of disc D1.

When record/reproduction target disc D1 is disposed at the disc delivery position, contact between roller 22 of arm 26 and disc D1 is avoided as illustrated in FIGS. 2A and 13 so as to smoothly transfer disc D1 by roller 20 and rubber guide member 28 from the disc delivery position (first position) illustrated in FIGS. 1A and 2A toward the second position illustrated in FIG. 2B without resistance by roller 22.

Figure 14:
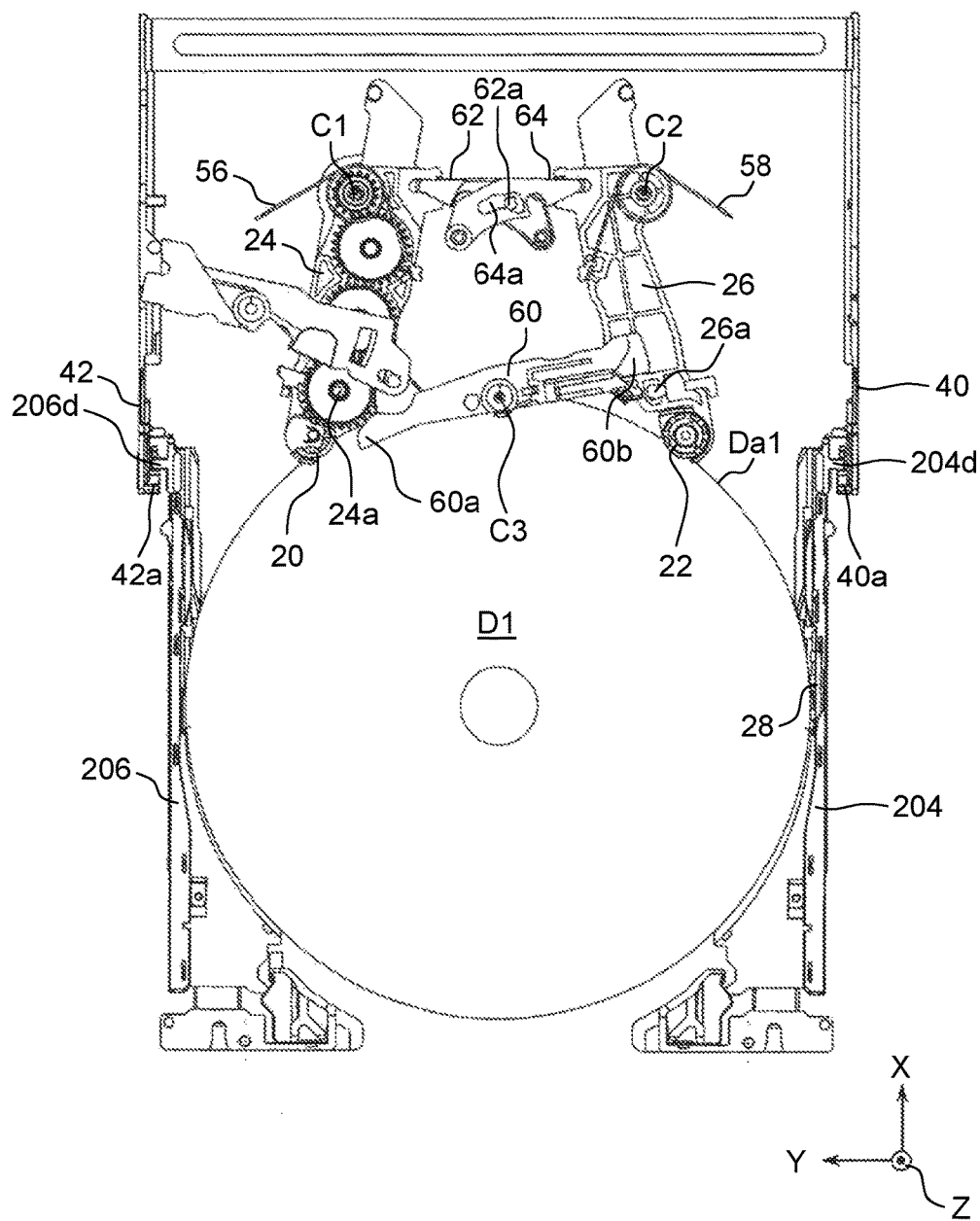
FIG. 14 is a top view of a part of the disc record/reproduction unit, showing a state that record/reproduction target disc D1 is disposed at the second position.
Figure 15:
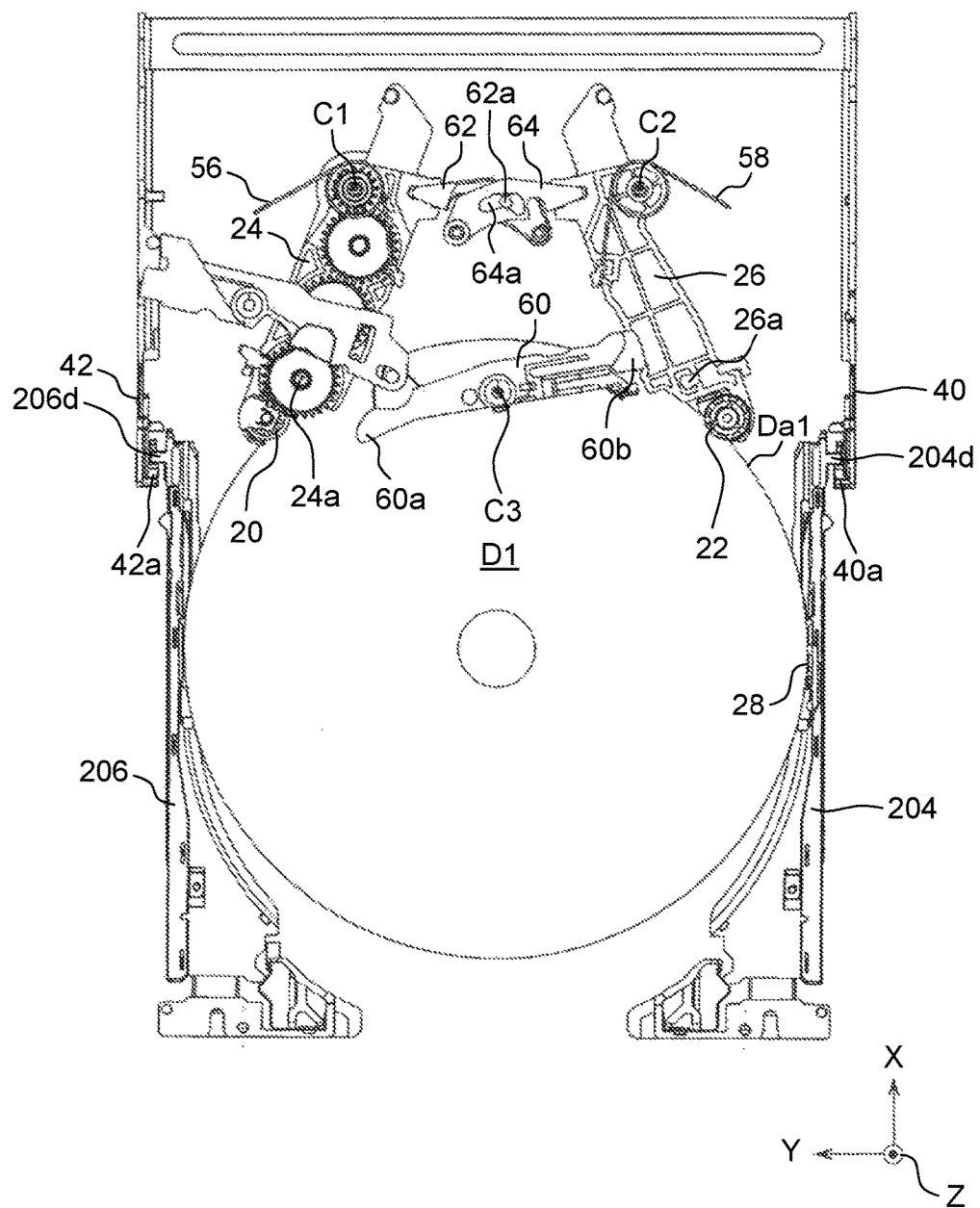
FIG. 15 is a top view of a part of the disc record/reproduction unit in a state that record/reproduction target disc D1 is transferred from the second position to the disc record/reproduction position (third position).

FIG. 14 illustrates record/reproduction target disc D1 shifted to the second position by roller 20 and rubber guide member 28. FIG. 15 illustrates record/reproduction target disc D1 transferred from the second position to the disc record/reproduction position (third position).

When disc D1 is disposed at the second position as illustrated in FIGS. 2B and 14, each of rollers 20, 22 is brought into contact with end face Da1 of disc D1 with predetermined contact pressure.

Roller 22 is not brought into contact with end face Da1 of record/reproduction target disc D1 during shift of disc D1 by roller 20 and rubber guide member 28 from the disc delivery position (first position) to the second position. When disc D1 reaches the second position as illustrated in FIG. 14, roller 22 is brought into contact with end face Da1 of disc D1 with predetermined contact pressure by torsion spring 58 which urges arm 26. Thereafter, disc D1 is transferred from the second position toward the disc record/reproduction position (third position) as illustrated in FIG. 15.

The urging force of torsion spring 56 which urges arm 24 supporting roller 20 is set larger than the urging force of torsion spring 58 which urges arm 26 supporting roller 22. These settings of the respective urging forces are determined for following reasons.

Suppose that settings of urging forces opposite to the above settings are determined, i.e., the urging force of torsion spring 56 is set smaller than the urging force of torsion spring 58. In this case, roller 22 pressed by torsion spring 56 via arm 24, roller 20 and record/reproduction target disc D1 may not shift in the state that the urging force of torsion spring 58 which urges roller 22 via arm 26 is larger than the urging force of torsion spring 56. As a result, disc D1 is unable to enter between rollers 20, 22 even with rotation of roller 20, wherefore disc D1 may come into a state difficult to transfer.

Accordingly, the urging force of torsion spring 56 is set larger than the urging force of torsion spring 58 such that roller 22 starts smoothly shifting against the urging force of torsion spring 58 after contact between record/reproduction target disc D1 and roller 22.

In addition, arms 24, 26 are configured to link with each other after contact between record/reproduction target disc D1 and roller 22 as illustrated in FIG. 14.

More specifically, arm 24 is coupled with coupling member 62 as illustrated in FIG. 14. Arm 26 is coupled with coupling member 64. Coupling member 64 of arm 26 includes cam hole 64a penetrating coupling member 64 in the Z axis direction. Coupling member 62 of arm 24 includes following pin 62a engaging with an inner circumferential surface of cam hole 64a of coupling member 64.

When roller 20 rotates and rolls on end face Da1 of record/reproduction target disc D1 after contact between disc D1 and roller 22, arm 24 revolves around revolution center axis C1. Coupling member 62 of arm 24 shifts, i.e., following pin 62a provided on coupling member 62 shifts in accordance with the revolution of arm 24.

Following pin 62a engages with the inner circumferential surface of cam hole 64a formed in coupling member 64 of arm 26. In this condition, coupling member 64 of arm 26 shifts in accordance with the shift of following pin 62a, whereby arm 26 revolves around swing center axis C2.

Respective shapes of following pin 62a of coupling member 62 of arm 24, and cam hole 64a of coupling member 64 of arm 26 are determined such that arm 26 does not start revolution until contact between record/reproduction target disc D1 and roller 22, and that arm 24 and arm 26 revolve in linkage with each other after contact between disc D1 and roller 22. More specifically, following pin 62a of coupling member 62 of arm 24 and cam hole 64a of coupling member 64 of arm 26 are shaped such that each of rollers 20, 22 shifts toward the positive side in the X axis direction while moving away from each other substantially at an identical speed in a state facing each other in the Y axis direction after contact between disc D1 and roller 22.

This linkage between arms 24, 26 allows positioning of record/reproduction target disc D1 at the disc record/reproduction position with high accuracy. More specifically, center hole Db1 of disc D1 is aligned with a position above spindle 18a of pickup unit 18 with high accuracy. Accordingly, secure clamping of disc D1 is achievable by spindle 18a.

According to the present exemplary embodiment, end face Da1 of record/reproduction target disc D1 is picked up without a slip, and then disc D1 is securely transferred in the radial direction (X axis direction).

The exemplary embodiment described herein is an example of the technology disclosed according to the present application. It is not intended, however, that the technology of the present disclosure be limited to the example presented herein. The technology of the present disclosure is applicable to exemplary embodiments including modifications, replacements, additions, omissions or others appropriately made.

While disc holder 202 holding disc D is constituted by two disc hold plates 204, 206 according to the present exemplary embodiment, disc holder 202 may be constituted by one part.

The plurality of disc holders 202 may be stored in body 12 of disc transfer device 10 instead of magazine 200.

According to the present exemplary embodiment, at least portions of roller 20, roller 22 (second retaining member), and rubber guide member 28 (first retaining member) brought into contact with the disc are made of an elastic material such as rubber. These portions may be made of an identical elastic material, or different elastic materials. When the portions are made of an identical elastic material, record/reproduction target disc D1 is more securely held by roller 20 and rubber guide member 28, and more securely held by roller 20 and roller 22. Accordingly, slipping of either one of roller 20 and rubber guide member 28, and either one of rollers 20, 22 on end face Da1 of disc D1 is avoidable.

Furthermore, according to the present exemplary embodiment, rollers 20, 22 are allowed to shift in the radial directions of the disc (X axis direction and Y axis direction) while being brought into contact with shifting disc D1 in the state that rollers 20, 22 are supported by arms 24, 26 revolving around the revolution center axis extending in the thickness direction of the disc (Z axis direction). The disc is therefore transferred in accordance with the shifts of rollers 20, 22. However, the mechanisms for supporting rollers 20, 22 by shifting in the radial directions of the disc are not limited to arms 24, 26. For example, rollers 20, 22 may be shifted in the radial directions of the disc via shafts provided for supporting rollers 20, 22 and guided along a groove.

Various exemplary embodiments have been described herein as examples of the technology according to the present disclosure. The accompanying drawings and detailed description have been presented for this purpose.

Accordingly, the accompanying drawings and the constituent elements contained in the detailed description may include not only constituent elements essential for solving the problems, but also constituent elements presented only by way of example of the above technology and unessential for solving the problems. It should not therefore be determined that the unessential constituent elements be essential only based on the fact that the unessential constituent elements are depicted and described in the appended drawings and the detailed description.

In addition, for the present exemplary embodiment described herein only by way of example of the technology according to the present disclosure, various modifications, replacements, additions, omissions or others may be made within the range of the appended claims or an equivalence of this range.

Finally, while the disc transfer device according to the present exemplary embodiment includes constituent elements necessary for record or reproduction of the disc, such as the disc record/reproduction unit for record or reproduction of the disc, it should be noted that these constituent elements are not essential constituent elements for transferring the disc.

A disc transfer device according to the present disclosure is, in a wide sense, a disc transfer device that transfers a disc in a first direction, being a radial direction of the disc, from a first position toward a third position via a second position. The disc transfer device includes a roller, a roller support mechanism, a first retaining member, a second retaining member, and a retaining member support mechanism.

The roller rotates around a rotation center axis that extends in a third direction, being a thickness direction of the disc, in a state that the roller is brought into contact with a radial end face of the disc on one side in a second direction, being a radial direction of the disc and being orthogonal to the first direction, until the disc reaches the third position from the first position.

The roller support mechanism supports the roller such that the roller is in contact with the transferred disc and moveable in the first direction and the second direction.

The first retaining member extends in the first direction, and is brought into contact with the radial end face of the disc on the other side in the second direction until the disc reaches at least the second position from the first position.

The second retaining member is brought into contact with the radial end face of the disc on the other side in the second direction until the disc reaches the third position from the second position.

The retaining member support mechanism supports the second retaining member such that the second retaining member is in contact with the transferred disc and is moveable in the first direction and the second direction.

A disc transfer device according to the present disclosure is applicable to a data archive device, a disc player having a disc changer function, or others.

What is claimed is:

1. A disc transfer device that transfers a disc in a first direction, being a radial direction of the disc, from a first position toward a third position via a second position,
   the disc transfer device comprising:
   a roller that rotates around a rotation center axis that extends in a third direction, being a thickness direction of the disc, in a state that the roller is brought into contact with a radial end face of the disc on one side in a second direction, being a radial direction of the disc and being orthogonal to the first direction, until the disc reaches the third position from the first position;
   a roller support mechanism that supports the roller such that the roller is in contact with the transferred disc and is moveable in the first direction and the second direction;
   a first retaining member that extends in the first direction, and is brought into contact with the radial end face of the disc on the other side in the second direction so that the first retaining member retains the disc toward the second direction until the disc reaches at least the second position from the first position;
   a second retaining member that is brought into contact with the radial end face of the disc on the other side in the second direction until the disc reaches the third position from the second position;
   a retaining member support mechanism that supports the second retaining member such that the second retaining member is in contact with the transferred disc and is moveable in the first direction and the second direction;
   a plurality of disc hold members each of which holds the disc such that the disc is slidable in the first direction, and disposed in a line in the third direction; and
   a disc hold member shift mechanism that slides one of the plurality of disc hold members in the first direction to position the disc held by the one of the plurality of disc hold members thus slid at the first position, wherein the roller support mechanism is a first arm that revolves around a first revolution center axis that extends in the third direction, and includes a free end that supports the roller, and the retaining member support mechanism is a second arm that revolves around a second revolution center axis that extends in the third direction, and includes a free end that supports the second retaining member, wherein the first arm and the second arm are not linked with each other before the disc is brought into contact with the roller.

2. The disc transfer device according to claim 1, wherein the first arm and the second arm are coupled and linked with each other after the disc is brought into contact with the second retaining member.

3. The disc transfer device according to claim 1, further comprising:
   a first urging member that urges the first arm such that the state of contact between the disc and the roller is maintained; and
   a second urging member that urges the second arm such that the state of contact between the disc and the second retaining member is maintained,
   wherein
   an urging force of the first urging member is larger than an urging force of the second urging member.

4. The disc transfer device according to claim 1, wherein the first retaining member, the roller, and the second retaining member are made of an identical elastic material.

5. The disc transfer device according to claim 1, further comprising
   a magazine detachably attached to the disc transfer device,
   wherein
   the plurality of disc hold members is stored in the magazine such that the disc hold members are disposed in a line in the third direction.

6. The disc transfer device according to claim 1, wherein the first retaining member is provided on each of the plurality of disc hold members.

* * * * *